United States Patent
Mir (10) Patent No.: US 7,184,792 B2
(45) Date of Patent: Feb. 27, 2007

(54) DELAYED DATA TRANSMISSION IN A WIRELESS COMMUNICATION SYSTEM AFTER PHYSICAL LAYER RECONFIGURATION

(75) Inventor: Idreas A. Mir, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 279 days.

(21) Appl. No.: 10/776,499

(22) Filed: Feb. 10, 2004

(65) Prior Publication Data

US 2005/0176437 A1    Aug. 11, 2005

(51) Int. Cl.
*H04Q 7/20* (2006.01)
*H04Q 7/00* (2006.01)

(52) U.S. Cl. .................. 455/522; 370/328
(58) Field of Classification Search .......... 455/522, 455/69, 453, 456, 450, 452.1, 436; 370/328
See application file for complete search history.

(56) References Cited

U.S. PATENT DOCUMENTS

| | | | |
|---|---|---|---|
| 6,865,387 B2 * | 3/2005 | Bucknell et al. | 455/418 |
| 2002/0082020 A1 | 6/2002 | Lee et al. | 455/450 |
| 2002/0173329 A1 * | 11/2002 | Hwang | 455/522 |
| 2005/0041581 A1 * | 2/2005 | Kuusinen et al. | 370/230 |

OTHER PUBLICATIONS

SIEMENS: "Considerations on Fast DCH Setup Issue Related to the Physical Random," 3GPP TSG RAN WG1 MEETING #32, May 19, 2003, pp. 1-4.

* cited by examiner

*Primary Examiner*—Melody Mehrpour
(74) *Attorney, Agent, or Firm*—Thomas Rouse; George C. Pappas; Matthew Evans (57) ABSTRACT

For delayed transmission after reconfiguration of the physical layer, a wireless network initially sends a first message (e.g., a Reconfiguration message) to a wireless device for reconfiguration of uplink and/or downlink physical channels. The wireless network then performs synchronization to establish the uplink physical channels, and the wireless device performs synchronization to establish the downlink physical channels. Upon completing the downlink synchronization, the wireless device sends a second message (e.g., a Reconfiguration Complete message) to the wireless network. The wireless network sends a Layer 2 acknowledgment (L2 ACK) upon successfully decoding the second message. The wireless network delays transmission of signaling/data on the downlink, except for transmission of certain messages such as those needed for reconfiguration, until successful decoding of the second message. The wireless device delays transmission of signaling/data on the uplink, again except for certain messages, until reception of the L2 ACK.

22 Claims, 10 Drawing Sheets

DELAYED DATA TRANSMISSION IN A WIRELESS COMMUNICATION SYSTEM AFTER PHYSICAL LAYER RECONFIGURATION

BACKGROUND

I. Field

The present invention relates generally to communication, and more specifically to techniques for transmitting signaling and data after reconfiguration of a physical layer in a wireless communication system.

II. Background

Wireless communication systems are widely deployed to provide various types of services such as voice, packet data, and so on. These systems may be multiple-access systems capable of supporting communication for multiple users, and may be based on Code Division Multiple Access (CDMA), Time Division Multiple Access (TDMA), Frequency Division Multiple Access (FDMA), or some other multiple access techniques. CDMA systems may provide certain advantages over other types of system such as increased system capacity.

A CDMA system may implement one or more commonly known CDMA standards such as Wideband-CDMA (W-CDMA), IS-2000, IS-856, IS-95, and so on. W-CDMA and IS-2000 are third generation CDMA standards with advanced capabilities and services. To conserve system resources, a wireless device (e.g., a cellular phone) in a third generation CDMA system is typically allocated sufficient system resources based on its requirements, which may in turn be dependent on the amount of activity at the wireless device. The allocated system resources may be defined by one or more physical channels used for data and signaling transmission, a specified rate for each physical channel, and so on. Additional or less system resources may be allocated to the wireless device whenever the amount of activity changes.

A reconfiguration process is typically performed between the CDMA system and the wireless device to effectuate a change in the allocation of system resources to the wireless device. The reconfiguration process is specified by the particular CDMA standard being implemented by the CDMA system and typically affects the physical layer (and possibly other layers). For example, in W-CDMA, the system and wireless device each perform a respective set of tasks for the reconfiguration process. The system and wireless device may require different amounts of time to complete the required tasks for the reconfiguration process. As a result, there exists a period of uncertainty during which the wireless device does not know whether the system has completed the reconfiguration process, and vice versa. If the wireless device transmits data during this uncertainty period, there is a high degree of likelihood that the data transmission will not be decoded correctly by the system. A failed data transmission wastes system resources, consumes battery power, and causes interference that degrades performance for other wireless devices, all of which are undesirable.

There is therefore a need in the art for techniques to efficiently transmit signaling and data after reconfiguration in a CDMA system.

SUMMARY

Techniques for performing delayed signaling and data transmission on the uplink and downlink after reconfiguration of the physical layer are described herein. These techniques may be used for various wireless communication systems and networks such as a UMTS (Universal Mobile Telecommunications System) Terrestrial Radio Access Network (UTRAN). These techniques can avoid the deleterious effects described above due to failed transmissions during the uncertainty period after reconfiguration of the physical layer.

In an embodiment of the delayed signaling and data transmission, a wireless network (e.g., a UTRAN) initially sends a first message (e.g., a Reconfiguration message) to a wireless device for reconfiguration of uplink and/or downlink physical channels for the physical layer. In response to this message, the wireless device performs synchronization to establish the downlink physical channels, and the wireless network performs synchronization to establish the uplink physical channels. The wireless device and wireless network may each perform synchronization starting at an activation time indicated by the Reconfiguration message and in accordance with a Synchronization procedure A defined by 3GPP (3rd Generation Partnership Project). Upon completion of the synchronization for the downlink physical channels, the wireless device sends a second message (e.g., a Reconfiguration Complete message) to the wireless network. Correspondingly, after completion of the synchronization for the uplink physical channels, the wireless network sends an indication that the uplink physical channels have been established. This indication may be a Layer 2 acknowledgment (L2 ACK) sent by the wireless network in response to successful decoding of the second message. To avoid failed transmissions during the period of uncertainty, the wireless network can delay transmission of signaling and data on the downlink, except for transmission of certain messages such as those needed for reconfiguration, until the second message is received from the wireless device. Correspondingly, the wireless device can delay transmission of signaling and data on the uplink, again except for certain messages, until the indication (e.g., L2 ACK) is received from the wireless network.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The delayed signaling and data transmission techniques described herein may be used for various wireless communication systems and networks. A network typically refers to a deployment of a system. For clarity, these techniques are specifically described for a UTRAN. The UTRAN provides over-the-air communication for wireless devices and may employs W-CDMA or Global System for Mobile Communications (GSM). W-CDMA is a third generation radio access technology (RAT) that is based on CDMA and can provide enhanced services and capabilities (e.g., higher data rates, concurrent voice and data calls, and so on). GSM is a second generation radio access technology that is based on TDMA. W-CDMA and GSM are defined by a set of documents published by a consortium named "$3^{rd}$ Generation Partnership Project" (3GPP). 3GPP documents are known in the art and publicly available. The W-CDMA standard is the portion of the 3GPP specifications that relates to W-CDMA.

Figure 1:
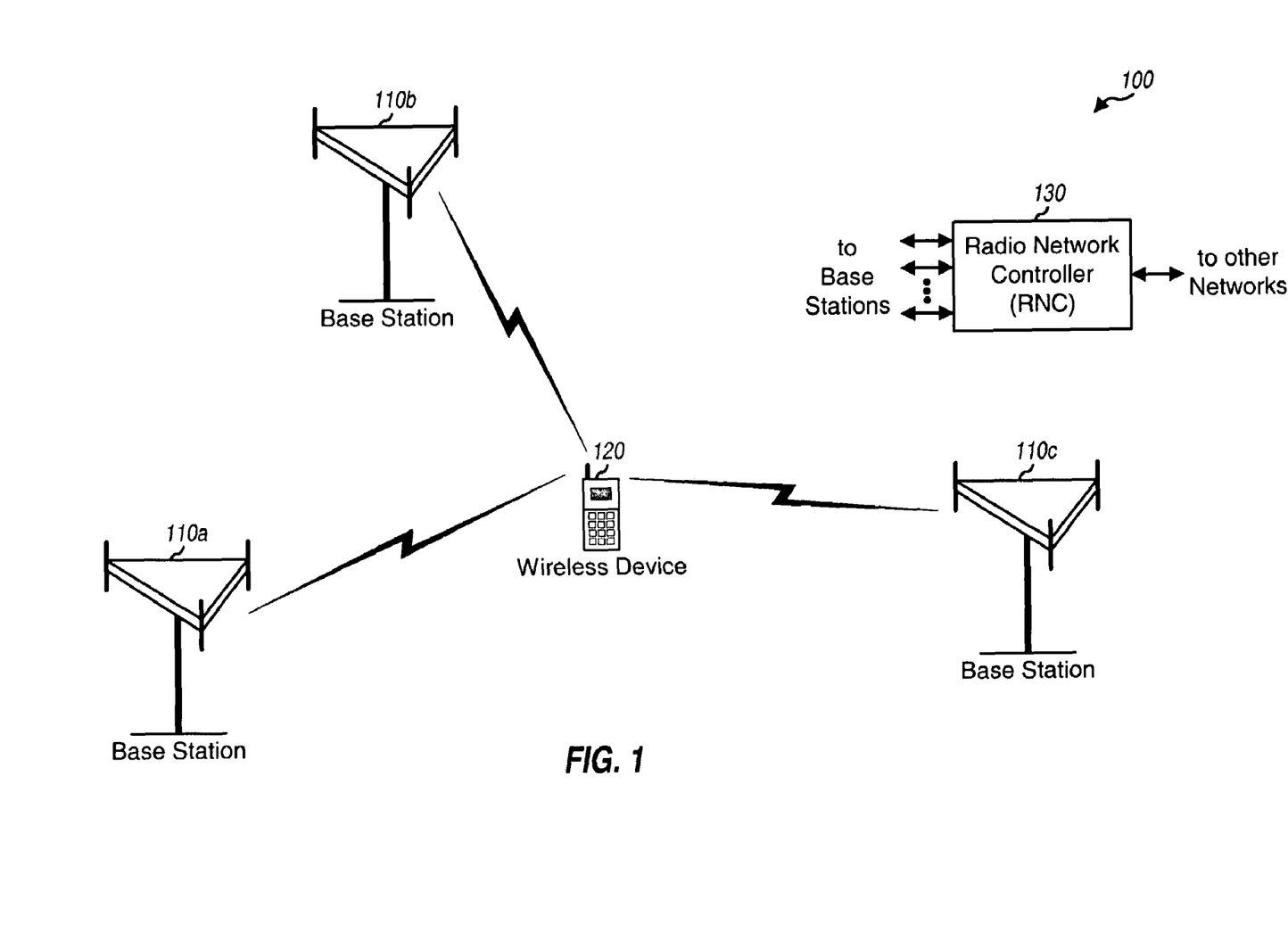
FIG. 1 shows a wireless network.

FIG. 1 shows a diagram of a UTRAN 100, which includes a number of base stations that communicate with a number of wireless devices. For simplicity, only three base stations 110*a*, 110*b*, and 110*c* and one wireless device 120 are shown in FIG. 1. A radio network controller (RNC) 130 couples to base stations 110 and provides coordination and control for these base stations.

A base station is referred to as a Node B in 3GPP terminology and may also be referred to as a base transceiver system (BTS), an access point, or some other terminology. Each base station provided communication coverage for a particular geographic area. A base station and/or its coverage area may also be referred to as a "cell", depending on the context in which the term is used.

A wireless device is referred to as a user equipment (UE) in 3GPP terminology and may also be referred to as a mobile station, a remote station, an access terminal, or some other terminology. A wireless device may communicate with one or more base stations on the downlink and/or uplink at any given moment, depending on whether or not the device is active, whether or not soft handover is supported for the data transmission, and whether or not the device is in soft handover. The downlink (or forward link) refers to the communication link from the base station to the wireless device, and the uplink (or reverse link) refers to the communication link from the wireless device to the base station. For clarity, the base stations are referred to as Node Bs, the wireless device is referred to as UE, and the network side (e.g., Node Bs and RNC) is referred to as UTRAN in the following description.

Figure 2:
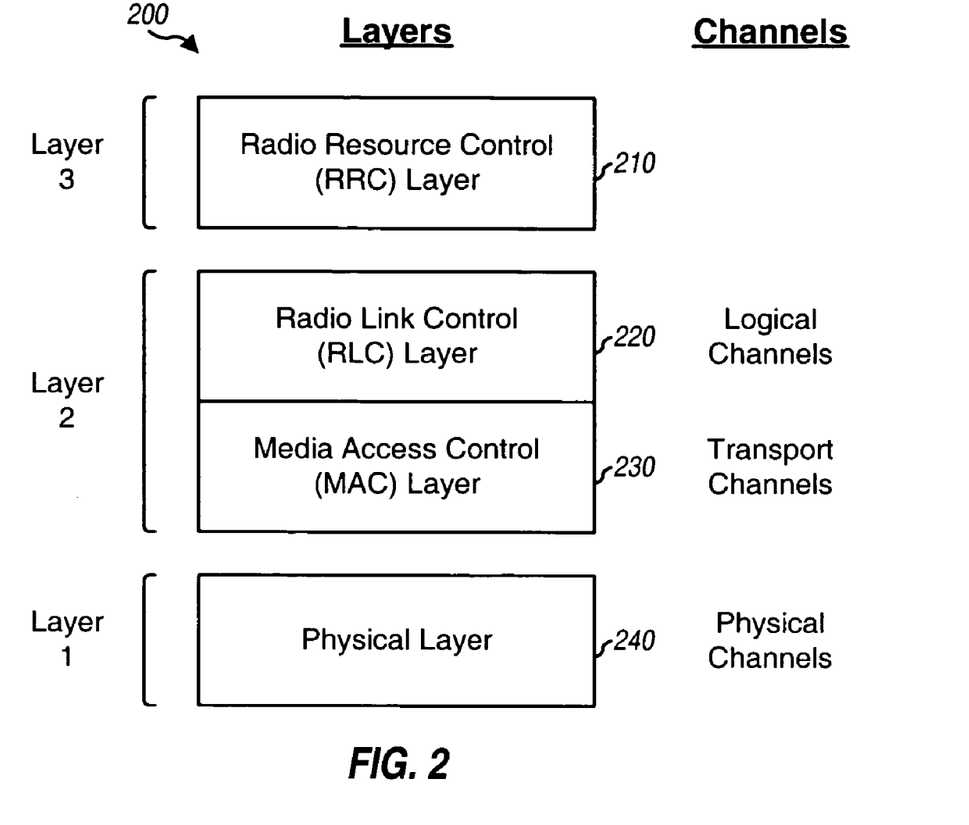
FIG. 2 shows a protocol stack defined by 3GPP.

FIG. 2 shows a protocol stack 200 defined by 3GPP Release 5. Protocol stack 200 includes a Radio Resource Control (RRC) layer 210, a Radio Link Control (RLC) layer 220, a Medium Access Control (MAC) layer 230, and a physical layer 240. RRC layer 210 is a sublayer of Layer 3. RLC layer 220 and MAC layer 230 are sublayers of Layer 2, which is commonly referred to as a Data Link Layer. Physical layer 240 is also referred to as Layer 1.

The RRC layer provides information transfer service to a Non Access Stratum (NAS), which is a functional layer that supports traffic and signaling messages between the UE and a core network (CN) with which the UTRAN interfaces. The RRC layer is also responsible for controlling the configuration of Layers 1 and 2. The RLC layer provides reliability for data transmission and performs automatic retransmission (ARQ) of data. In the RLC layer, data is processed as belonging to logical channels. The MAC layer performs a number of functions such as (1) mapping and/or multiplexing logical channels to transport channels and (2) processing (e.g., coding, interleaving, and rate matching) of data for each transport channel. The physical layer provides a mechanism for transmitting data for the MAC layer and signaling for higher layers. The physical layer performs a number of functions such as (1) mapping transport channels to physical channels, (2) processing (e.g., channelization/spreading and scrambling) of data for each physical channel, and (3) power control of each set of physical channels.

On the network side, the physical layer is typically implemented at the Node Bs, and the RLC, MAC, and RRC layers are typically implemented at the RNC. The layers for 3GPP are described in various 3GPP documents.

As indicated in FIG. 2, data is processed as transport channels in the MAC layer. These transport channels include the following:

Dedicated Transport Channel (DCH)—a transport channel used to carry data for a specific UE.

Forward Access Channel (FACH)—a downlink transport channel used to send signaling and small quantities of data to UEs in a cell.

Paging Channel (PCH)—a downlink transport channel used to broadcast paging and notification messages to UEs in a cell.

Random Access Channel (RACH)—an uplink transport channel used by the UEs to access the network.

As also indicated in FIG. 2, data is processed as physical channels in the physical layer. The physical channels include the following:

Secondary Common Control Physical Channel (S-CCPCH)—a downlink physical channel used to carry the PCH and FACH.

Physical Random Access Channel (PRACH)—an uplink physical channel used to carry the RACH.

Dedicated Physical Data Channel (DPDCH)—a physical channel dedicated to a specific UE and used to carry the DCH. There may be zero, one, or multiple DPDCHs on each radio link.

Dedicated Physical Control Channel (DPCCH)—a physical channel dedicated to a specific UE and used to carry control information generated by the physical layer for the DCH.

A radio link refers to the communication between the UE and a single node B. The UE may establish multiple radio links with multiple Node Bs for soft handover.

Figure 3:
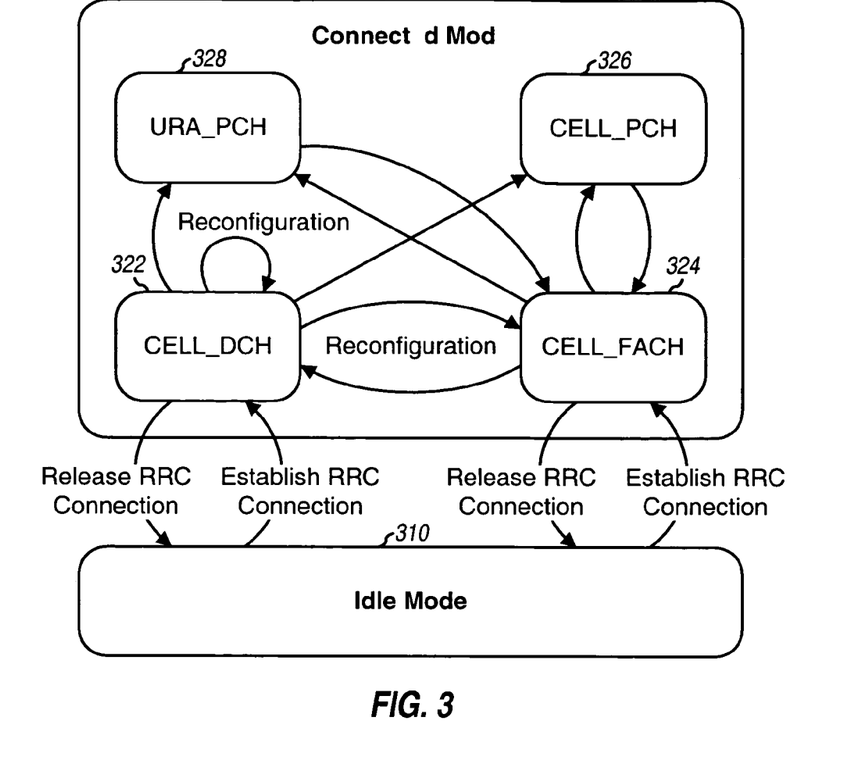
FIG. 3 shows a state diagram of the possible states for a wireless device.

FIG. 3 shows a state diagram of the RRC states for a UE. Upon being powered on, the UE performs cell selection to find a suitable cell from which it can receive service. Thereafter, the UE may transition to an idle mode 310 or a connected mode 320 depending on whether or not there is any activity for the UE. In the idle mode, the UE has registered with the network, is listening for paging messages, and updates its location with the network when necessary. In the connected mode, the UE can receive and/or transmit data, depending on its RRC state and configuration.

While in the connected mode, the UE may be in one of four possible RRC states—a CELL_DCH state 322, a CELL_FACH state 324, a CELL_PCH state 326, or a URA_PCH state 328. The CELL_DCH state is characterized by (1) a dedicated physical channel being allocated to the UE for the uplink and downlink and (2) a combination of dedicated and shared transport channels being available to the UE. The CELL_FACH state is characterized by (1) no dedicated physical channel being allocated to the UE, (2) a default common or shared transport channel (e.g. RACH) on the uplink being assigned to the UE for use to access the network, and (3) the UE continuously monitoring the FACH on the downlink for signaling such as Reconfiguration messages. The CELL_PCH and URA_PCH states are characterized by (1) no dedicated physical channel being allocated to the UE, (2) the UE periodically monitoring the paging channel (PCH) for paging messages, and (3) the UE not being permitted to transmit on the uplink. The modes and states for the UE are described in detail in 3GPP TS 25.331.

The UTRAN can command the UE to be in one of the four possible states, while in the connected mode, based on the activity of the UE. The UE may transition (1) from the CELL_DCH or CELL_FACH state in the connected mode to the idle mode by performing a Release RRC Connection procedure, (2) from the idle mode to the CELL_DCH or CELL_FACH state by performing an Establish RRC Connection procedure, (3) between the CELL_DCH and CELL_FACH states by performing a reconfiguration procedure, and (4) between different configurations in the CELL_DCH state by also performing a reconfiguration procedure. These procedures are described in 3GPP TS 25.331.

3GPP defines reconfiguration procedures for radio bearer reconfiguration, transport channel reconfiguration, and physical channel reconfiguration. All of these reconfigurations allow for reconfiguration of the physical channels in the physical layer. A radio bearer is a service provided by Layer 2 for the transfer of user data between the UE and UTRAN. One or multiple radio bearers may be maintained by peer entities on Layer 2 in the UE and UTRAN. Each radio bearer is associated with a specific configuration for the logical, transport, and physical channels. The configuration for each radio bearer may describe the particular channels to use, the rate for each channel, the channelization code (OVSF code) for the physical channel, and so on. The configuration for each radio bearer is dependent on the amount of activity at the UE. For example, the LE may be placed in (1) the CELL_DCH state if the UE has data to transmit or receive or (2) the CELL_FACH state if the UE has no data to transmit or receive. The UE may also change its configuration if the amount of activity changes. A change in the configuration of the UE is effectuated by performing an appropriate reconfiguration procedure.

Figure 4:
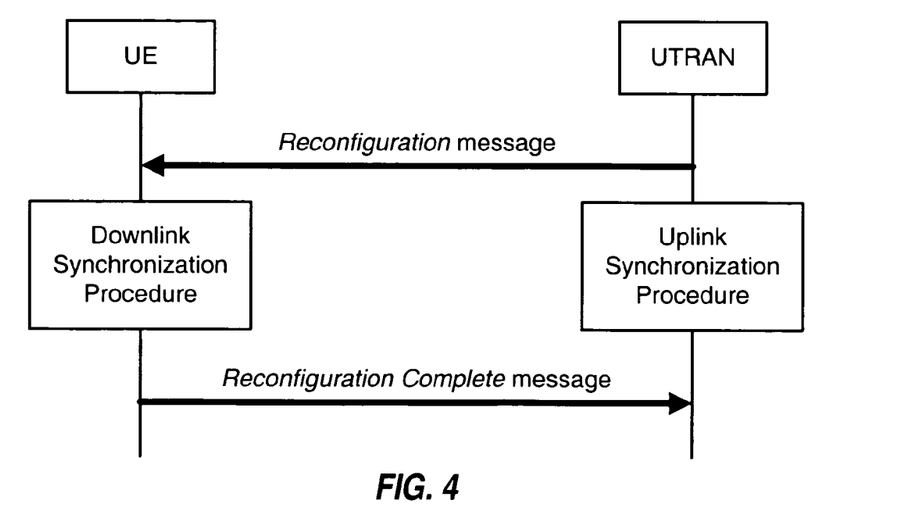
FIG. 4 shows a signaling flow for a reconfiguration procedure.

FIG. 4 shows a signaling flow for a reconfiguration procedure. The UTRAN initiates the reconfiguration procedure by sending a Reconfiguration message that may include (1) pertinent information such as the new configuration, e.g., new parameters for the transport and physical channels and (2) an activation time at which a synchronization procedure is to commence. The UTRAN can initiate reconfiguration by itself (i.e., autonomously) or in response to signaling received from the UE on the PRACH. The UE and UTRAN perform downlink and uplink synchronization procedures to establish the physical layer for the downlink and uplink, respectively. Upon completing the downlink synchronization procedure, the UE sends a Reconfiguration Complete message if the reconfiguration is successful (as shown in FIG. 4) or a Reconfiguration Failure message if the reconfiguration is unsuccessful (not shown in FIG. 4).

Different messages are sent by the UTRAN and UE depending on the particular reconfiguration procedure being performed. For example, Radio Bearer Reconfiguration and Radio Bearer Reconfiguration Complete messages are sent for radio bearer reconfiguration, Transport Channel Reconfiguration and Transport Channel Reconfiguration Complete messages are sent for transport channel reconfiguration, and Physical Channel Reconfiguration and Physical Channel Reconfiguration Complete messages are sent for physical channel reconfiguration. The Reconfiguration and Reconfiguration Complete messages are intended to be generic messages that may correspond to any one of the above message sets or some other message set.

Figure 5:
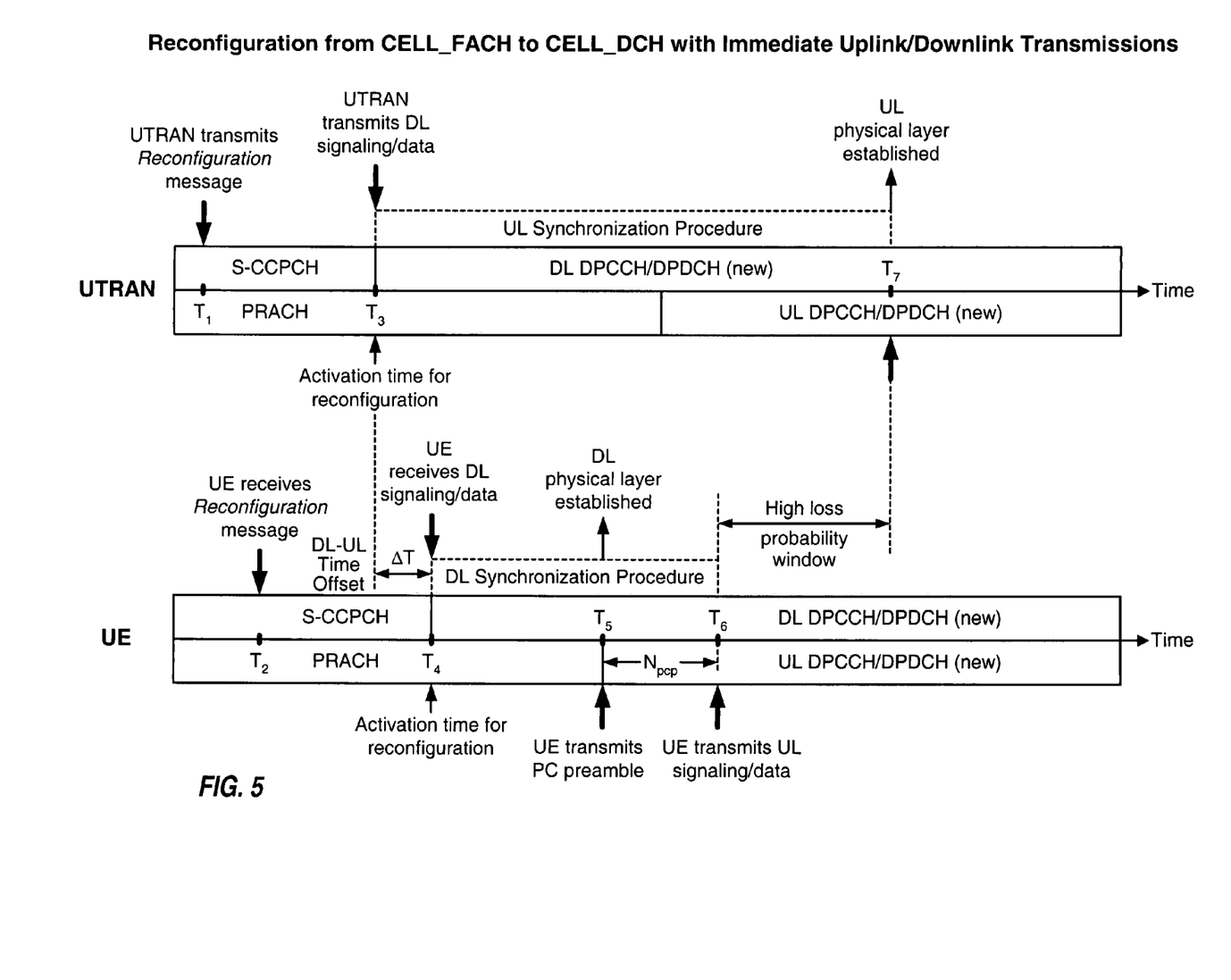
FIG. 5 shows reconfigation with immediate downlink and uplink transmissions.

FIG. 5 shows a timeline for reconfiguration from the CELL_FACH state to the CELL_DCH state with immediate signaling/data transmission on the downlink and uplink. For clarity, the physical channels used for downlink transmission are shown above a horizontal line representing time, and the physical channels used for uplink transmission are shown below this line. Heavy downward pointing arrows indicate downlink transmissions, and heavy upward pointing arrows indicate uplink transmissions. Thin upward pointing arrows indicate primitives sent by one layer in the protocol stack to another layer.

While in the CELL_FACH state, the UE monitors the S-CCPCH (which carries paging messages for the PCH and signaling for the FACH on the downlink) and may transmit signaling on the uplink via the PRACH to access the network. The UTRAN transmits a Reconfiguration message on the S-CCPCH starting at time $T_1$, and the UE receives this message starting at time $T_2$. The difference between times $T_1$ and $T_2$ is due to propagation delay between the UTRAN and UE. At time $T_3$, which is an activation time for reconfiguration for the UTRAN and indicated by the Reconfiguration message, the UTRAN commences a synchronization procedure for the uplink (UL). At time $T_4$, which is the activation time for reconfiguration for the UE, the UE commences a synchronization procedure for the downlink (DL). The activation time is given in connection frame number (CFN), which gives cell timing in units of (10 msec) radio frames. The start of radio frame i for the UE is delayed relative to the start of radio frame i for the UTRAN by a specified DL-UL timing offset ($\Delta T$). This timing offset is 1024 chips for all UEs. The difference between times $T_3$ and $T_4$ corresponds to the DL-UL timing offset.

3GPP defines two synchronization procedures to obtain synchronization of dedicated physical channels between the UE and UTRAN. Synchronization procedure A is used if at least one downlink dedicated physical channel and at least one uplink dedicated physical channel are to be set up on a frequency and all of the radio links after reconfiguration are new. Synchronization procedure B is used if one or more radio links are added to the active set of the UE and at least one existing radio link is retained after reconfiguration. The particular synchronization procedure to use is thus dependent on the radio link(s) for the UE. Synchronization procedures A and B are both described in 3GPP TS 25.214.

The set of tasks performed by the UTRAN for uplink Synchronization procedure A includes:

1. Start transmitting signaling on the downlink DPCCH;
2. Establish uplink chip and frame synchronization based on a pilot sent on the uplink DPCCH by the UE;

3. Confirm uplink frame synchronization based on a frame synchronization word embedded in the uplink pilot; and
4. Determine if the uplink physical channel has been established.

The signaling on the downlink DPCCH includes transmit power control (TPC) commands, a dedicated pilot, and a transport format combination indicator (TFCI) used by the UE to decode the downlink DPDCH. The uplink chip and frame synchronization are established for each radio link set, which is a set of one or more radio links having a common generation of TPC commands. Each radio link set remains in an initial state until a predetermined number of successive "in-sync" indications are received from Layer 1, at which time synchronization is achieved for the radio link set. The in-sync indication is described in 3GPP TS 25.214.

The set of tasks performed by the UE for downlink Synchronization procedure A includes:
1. Establish downlink chip and frame synchronization for the downlink DPCCH using the timing of the P-CCPCH and timing offset information sent by the UTRAN;
2. Confirm downlink frame synchronization based on a frame synchronization word embedded in the downlink pilot;
3. Report downlink synchronization status to higher layers in each radio frame;
4. Determine if the downlink physical channel has been established; and
5. Transmit a power control (PC) preamble on the uplink DPCCH for $N_{pcp}$ radio frames after the downlink physical channel has been established.

As shown in FIG. 5, the UE determines the downlink physical layer to be established at time $T_5$ and starts transmitting the power control preamble on the new uplink DPCCH. The power control preamble is used by the UTRAN to detect that the UE has obtained synchronization for the downlink physical channels. At time $T_6$, which is $N_{pcp}$ radio frames after time $T_5$, the UE starts transmitting a Reconfiguration Complete message on the uplink DPCCH. At time $T_7$, the UTRAN determines the uplink physical layer to be established.

As shown in FIG. 5 and in accordance with the 3GPP standard, the UTRAN can start transmitting data on the new downlink DPDCH at any time, starting from the activation time, if the UTRAN has data to send to the UE. The UE can start transmitting data (e.g., data blocks associated with radio access bearers) on the new uplink DPDCH at any time, starting from time $T_6$, after the UE has transmitted the power control preamble for $N_{pcp}$ radio frames on the uplink DPCCH.

However, the UTRAN and UE may have different reconfiguration delays and may require different amounts of time to complete the uplink and downlink synchronization procedures, respectively. The UTRAN may establish the uplink physical layer at some time after the UE is allowed to transmit on the uplink, as shown in FIG. 5. If the UE transmits data on the uplink DPDCH at any time between $T_6$ and $T_7$, there is a high likelihood that the uplink transmission sent by the UE will not be decoded correctly by the UTRAN since the uplink physical layer has not been established. The time period between times $T_6$ and $T_7$ may be considered as a high loss probability window. This window ceases to exist once the UTRAN declares the uplink physical layer established.

Any transmission sent by the UE and decoded in error by the UTRAN may need to be retransmitted by the UE. The RLC layer determines which signaling and data blocks are decoded in error and initiates retransmission of these blocks. The transmission/retransmission of signaling and data is highly undesirable for several reasons. First, the transmission that is decoded in error causes interference to other uplink transmissions and degrades their performance. Second, the transmission/retransmission results in a loss of system capacity. Third, the transmission/retransmission consumes battery resources of the UE. It is therefore desirable to minimize the amount of signaling and data to retransmit.

Figure 6:
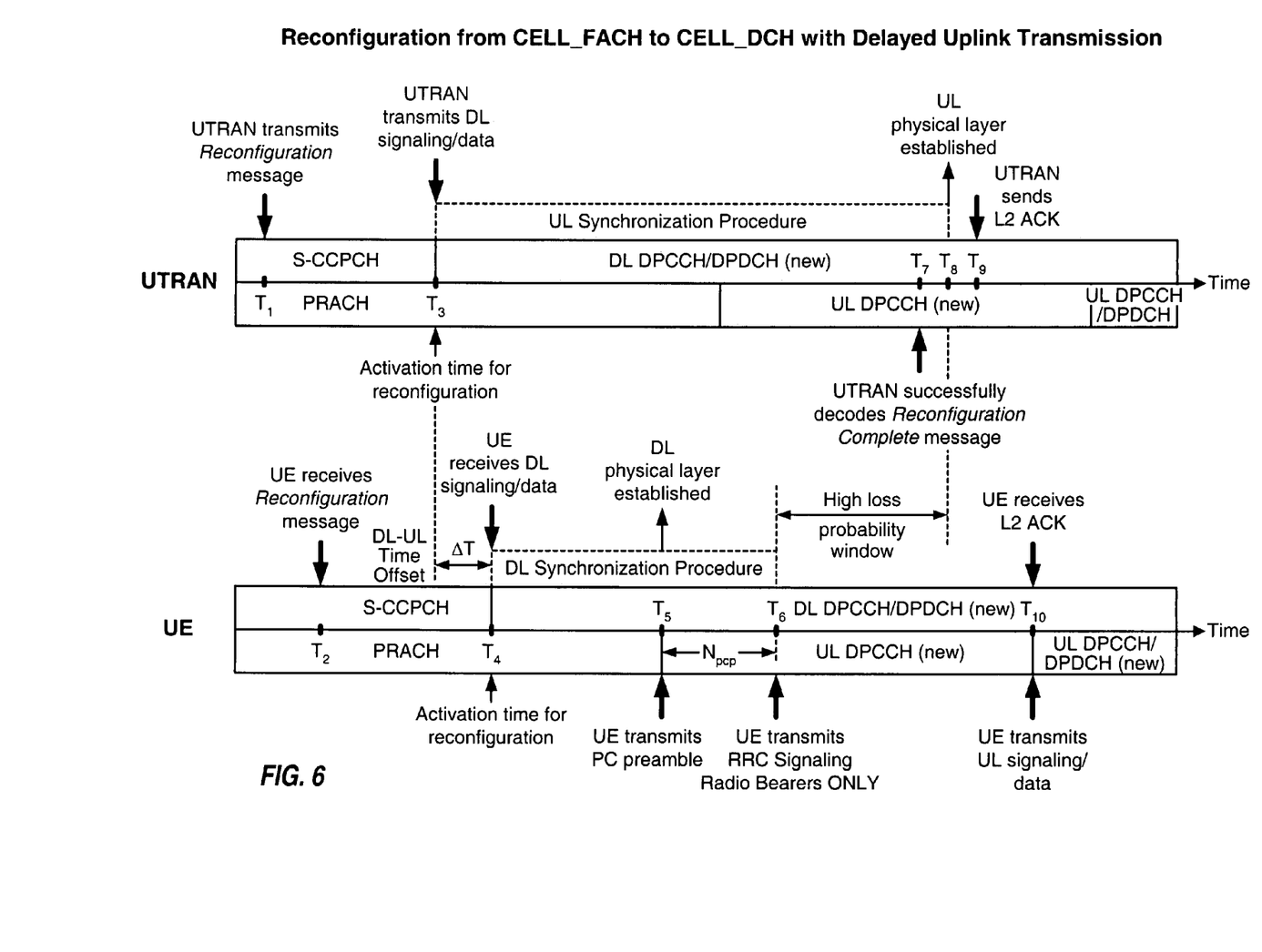
FIG. 6 shows reconfiguration from a CELL_FACH state to a CELL_DCH state with delayed uplink transmission.

FIG. 6 shows a timeline for reconfiguration from the CELL_FACH state to the CELL_DCH state with delayed uplink transmission. The UTRAN transmits a Reconfiguration message on the S-CCPCH starting at time $T_1$, and the UE receives the message starting at time $T_2$. The UTRAN commences an uplink synchronization procedure at time $T_3$. The UE commences a downlink synchronization procedure at time $T_4$, determines the downlink physical layer to be established at time $T_5$, and transmits the power control preamble on the new uplink DPCCH starting at time $T_5$. For the embodiment shown in FIG. 6, the UE transmits only signaling for RRC signaling radio bearers starting at time $T_6$, which is $N_{pcp}$ radio frames after time $T_5$.

The RRC signaling radio bearers are radio bearers available for transmission of RRC messages. 3GPP defines a number of RRC signaling radio bearers for sending RRC messages on logical channels such as a dedicated control channel (DCCH) and a common control channel (CCCH). A signaling radio bearer RB2 is used for all RRC messages sent on the DCCH using an acknowledged mode (RLC-AM), except for RRC messages carrying higher layer signaling. The RRC signaling radio bearers are described in 3GPP TS 25.331.

In FIG. 6, the UE transmits a Reconfiguration Complete message (which is an RRC message) using RRC signaling radio bearer RB2 starting at time $T_6$. The Reconfiguration Complete message is processed as a single Service Data Unit (SDU) at the RLC layer. The SDU may be partitioned into multiple Protocol Data Units (PDUs) at the MAC layer. The UE processes (e.g., encodes, interleaves, and modulates) and transmits each PDU separately. At the UTRAN, a reordering entity at the MAC layer receives and re-assembles the PDUs for the Reconfiguration Complete message and provides a re-assembled SDU with the received PDUs to the RLC layer. 3GPP requires the UE to send the Reconfiguration Complete message using the RLC acknowledged mode (RLC-AM). This mode requires an RLC entity at the UTRAN to send a Layer 2 acknowledgment (L2 ACK) if the re-assembled SDU is decoded correctly.

The UE may transmit the Reconfiguration Complete message once or multiple times until the message is received and correctly decoded by the UTRAN. The UTRAN successfully decodes the Reconfiguration Complete message at time $T_7$ and, in response, sends an L2 ACK to the UE at time $T_9$. At time $T_8$, which occurs sometime after time $T_7$, the UTRAN determines the uplink physical layer to be established, and the high loss probability window ceases to exist. Time $T_8$ may occur before or after time $T_9$.

The UE receives the L2 ACK at time $T_{10}$ and ascertains that the uplink physical channel has been established at the UTRAN since the Reconfiguration Complete message sent on the uplink DPCCH was successfully decoded by the UTRAN. The UE can then transmit signaling on the uplink DPCCH and data on the uplink DPDCH starting at time $T_{10}$.

Figure 7:
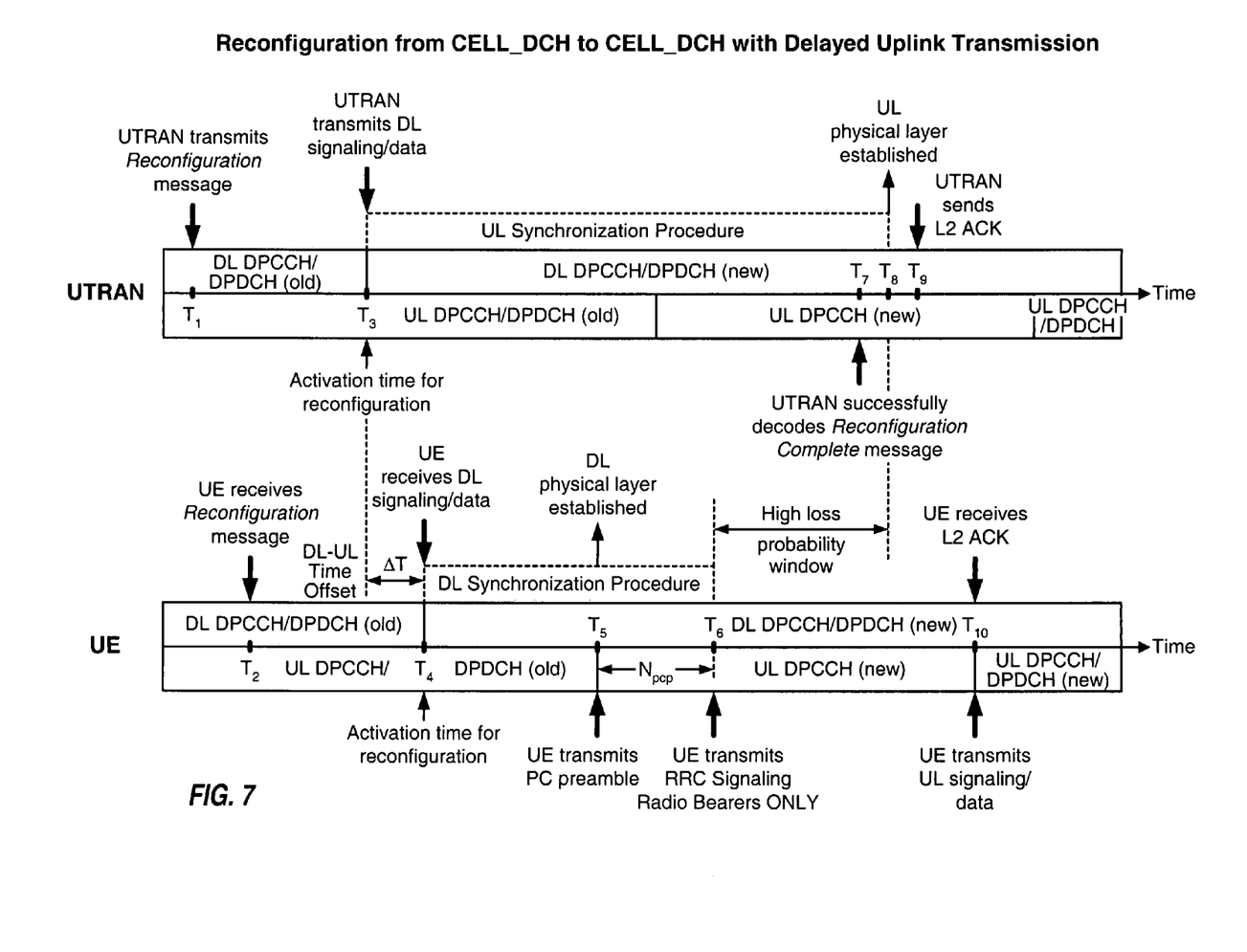
FIG. 7 shows reconfiguration from the CELL_DCH state to the CELL_DCH state with delayed uplink transmission.

FIG. 7 shows a timeline for reconfiguration from the CELL_DCH state to the CELL_DCH state with delayed uplink transmission. The UTRAN transmits a Reconfiguration message on the old downlink DPCCH starting at time $T_1$, and the UE receives the message starting at time $T_2$. This Reconfiguration message may be for reconfiguration of the radio bearer, transport channels, and/or physical channels for the same frequency or a different frequency. In response to the Reconfiguration message, the UTRAN and UE perform uplink and downlink synchronization procedures for the reconfiguration and the UE delays transmission of signaling and data on the uplink in the manner described above for FIG. 6.

Figure 8:
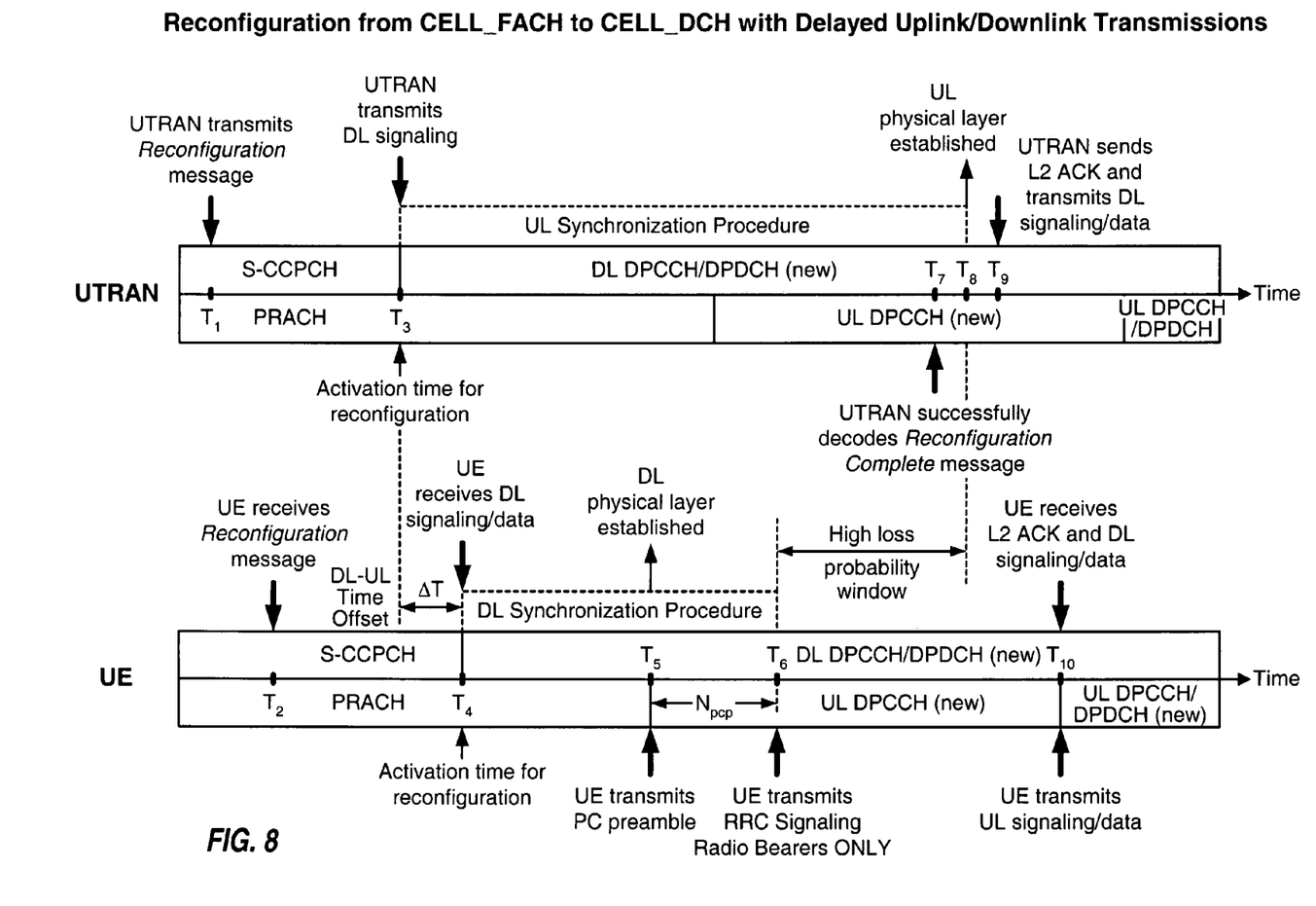
FIG. 8 shows reconfiguration from the CELL_FACH state to the CELL_DCH state with delayed uplink and downlink transmissions.

FIG. 8 shows a timeline for reconfiguration from the CELL_FACH state to the CELL_DCH state with delayed uplink and downlink transmissions. The UTRAN transmits a Reconfiguration message on the S-CCPCH starting at time $T_1$, and the UE receives the message starting at time $T_2$. At the activation time $T_3$, the UTRAN commences an uplink synchronization procedure and transmits only signaling on the downlink on the new downlink DPCCH. The UE commences a downlink synchronization procedure at activation time $T_4$, determines the downlink physical layer to be established at time $T_5$, and transmits the power control preamble on the new uplink DPCCH starting at time $T_5$.

The UE transmits a Reconfiguration Complete message and signaling for RRC signaling radio bearers starting at time $T_6$, which is $N_{pcp}$ radio frames after time $T_5$. The UTRAN receives and successfully decodes the Reconfiguration Complete message at time $T_7$ and, in response, sends an L2 ACK at time $T_9$. The UTRAN can also transmit signaling and data on the new downlink DPCCH/DPDCH starting at time $T_7$ (or time $T_9$, as shown in FIG. 8). The UE receives the L2 ACK at time $T_{10}$, ascertains that the uplink physical layer has been established at the UTRAN, and can transmit signaling and data on the new uplink DPCCH/DPDCH starting at time $T_{10}$.

Figure 9:
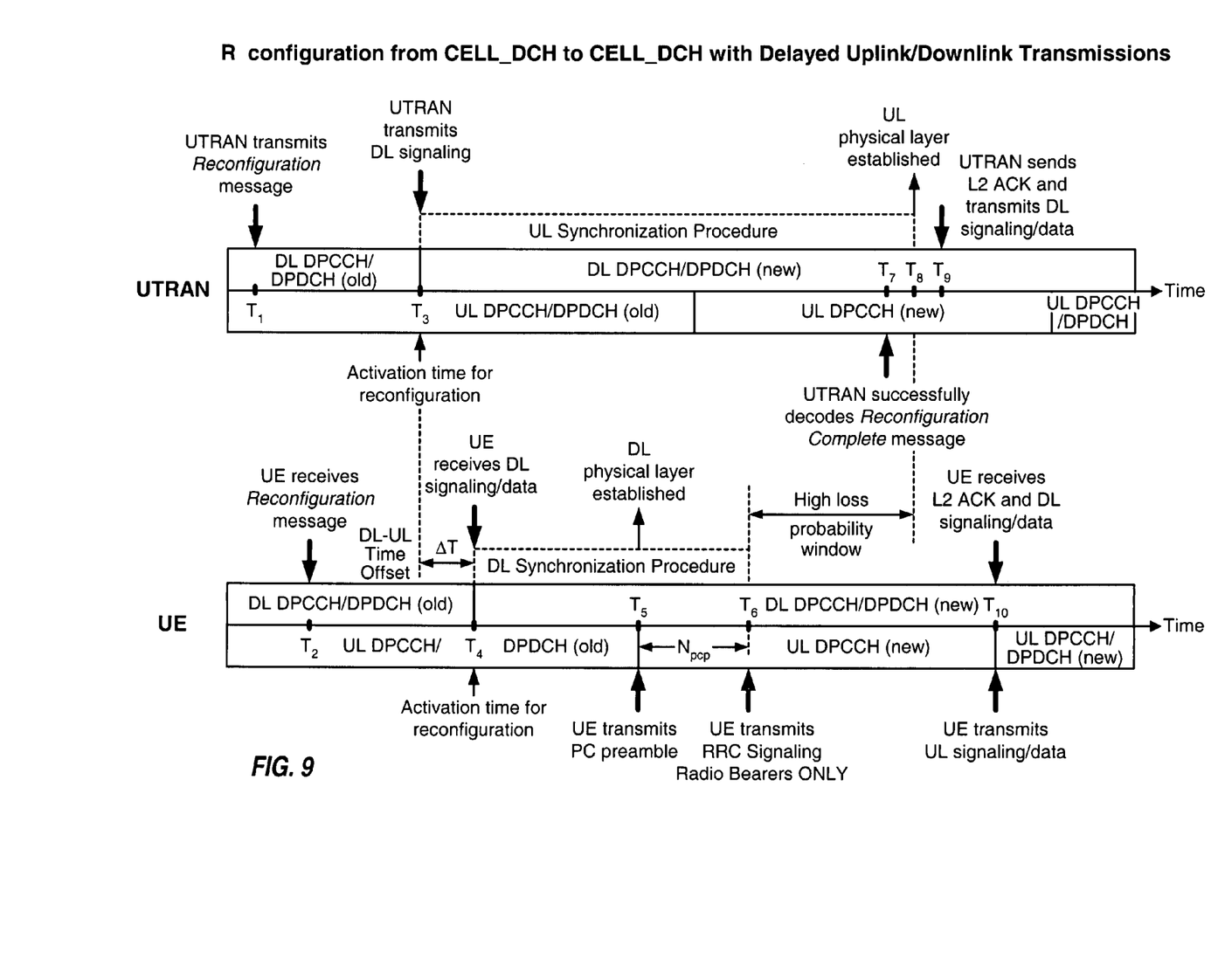
FIG. 9 shows reconfiguration from the CELL_DCH state to the CELL_DCH state with delayed uplink and downlink transmissions.

FIG. 9 shows a timeline for reconfiguration from the CELL_DCH state to the CELL_DCH state with delayed uplink and downlink transmissions. The reconfiguration process in FIG. 9 is similar to the reconfiguration process in FIG. 8, except that the UTRAN transmits a Reconfiguration message on the old downlink DPCCH (instead of the S-CCPCH) since the UE is in the CELL_DCH state. The UTRAN delays transmission of signaling and data on the downlink until the Reconfiguration Complete message is successfully decoded. The UE delays transmission of signaling and data on the uplink until an L2 ACK is received from the UTRAN.

For the embodiments shown in FIGS. 6 through 9, the UE delays transmission on the new uplink physical channels, except for signaling for RRC signaling radio bearers, until the UE can ascertain that the uplink physical layer has been established at the UTRAN. At this time, the high loss probability window has ceased to exist and the signaling and data transmission on the new uplink DPCCH and DPDCH can be reliably received by the UTRAN. For the embodiments shown in FIGS. 7 and 9, the UTRAN delays transmission on the new downlink physical channels until it can ascertain that the downlink physical layer has been established at the UE.

By minimizing uplink and downlink transmissions to only pertinent signaling, until it can be ascertained that the downlink and uplink physical channels have been established, the deleterious effects described above can be avoided. In particular, the UTRAN and UE can avoid transmitting large amounts of data that have a high likelihood of getting lost during the window of uncertainty. This reduces interference to other users in the network and increases the average system capacity. The UE can also conserve battery because power consumption for retransmission, which may be significant, is avoided. With delayed transmission, the receiving RLC entities at the UE and UTRAN are likely to receive SDUs without error and can pass re-assembled SDUs up to higher layers right away. In contrast, with immediate transmission, the receiving RLC entities at the UE and UTRAN may receive the PDUs or SDUs in error, and would then have to stall delivery of the re-assembled SDUs to higher layers until the missing PDUs and SDUs are received via retransmissions. The additional delays for retransmission may trigger timeouts at higher layers (e.g., TCP layer), which may then have a significant adverse impact on end-to-end throughput.

FIGS. 6 through 9 show one mechanism that may be used by the UE to ascertain that the uplink physical layer has been established at the UTRAN. This mechanism uses an L2 ACK that is automatically sent by the UTRAN upon successful decoding of the Reconfiguration Complete message. Thus, no additional signaling and no changes to the existing signaling are required for this mechanism.

Other mechanisms may also be used by the UE to ascertain that the uplink physical layer has been established, and this is within the scope of the invention. As an example, the UE can make this determination based on TPC commands received from the UTRAN. For each radio link set that has been established through reconfiguration, the UTRAN periodically transmits TPC commands on the downlink DPCCH to adjust the transmit power used for the uplink physical channels in that radio link set. Each TPC command may be an UP command to direct the UE to increase the transmit power by a first amount (e.g., 0.5 dB) or a DOWN command to direct the UE to decrease the transmit power by a second amount (e.g., 0.005 dB). The UE can deem that the uplink physical layer has been established or not if (1) a predetermined number of DOWN commands are received from the UTRAN, (2) a predetermined number of UP commands are received, or (3) based on some other criteria. Similarly, the UTRAN can deem that the UE has achieved DL synchronization by checking for a predetermined number of UP/DOWN commands received on the uplink.

As another example, the LE may start a timer when the Reconfiguration Complete message has been sent and may assume that the uplink physical layer is established when the timer expires. The timer may be set to (1) the amount of time expected to be required by the UTRAN to establish the uplink physical layer, (2) the amount of time required by the UTRAN to establish the uplink physical layer in the last reconfiguration, or (3) some other time value.

The delay in the uplink transmission, until the UE can ascertain that the uplink physical layer has been established, may be achieved in various manners. In one exemplary implementation, an RRC entity sets a flag in a MAC entity when the RRC entity is ready to transmit the Reconfiguration Complete message using the new physical channel configuration. This flag, once set, disables the MAC entity from requesting transport blocks from all radio bearers except for signaling radio bearer RB2, which is the signaling radio bearer used to send the Reconfiguration Complete message. Upon receiving an indication that the uplink physical layer has been established (e.g., an L2 ACK for the Reconfiguration Complete message), the RRC layer resets the flag in the MAC layer. This flag, once reset, allows uplink transmission on all radio bearers.

The delay in the downlink transmission, until the UTRAN can ascertain that the downlink physical layer has been established, may also be implemented in various manners. For example, an RRC entity at the UTRAN may (1) set a flag in a MAC entity at the activation time and (2) reset the flag when the uplink physical layer is established.

Figure 10:
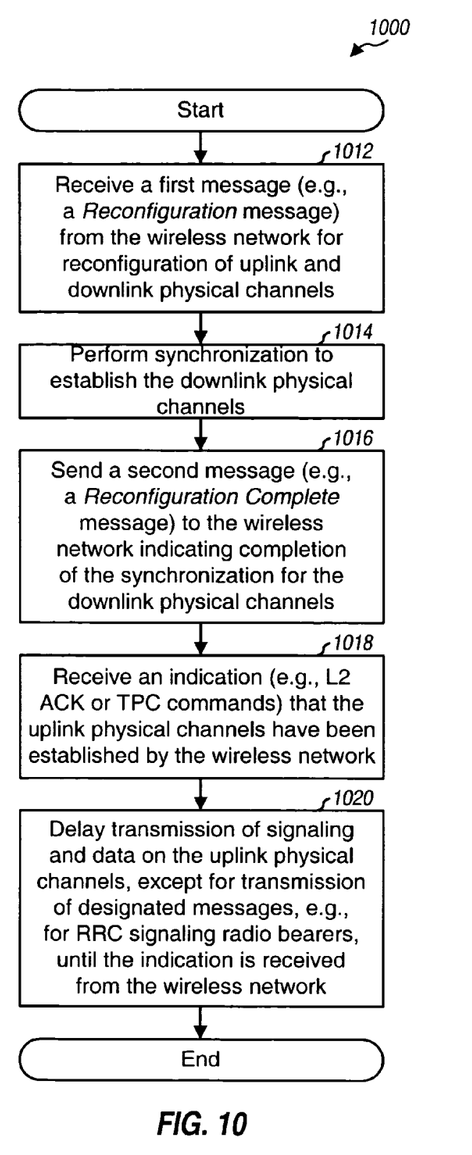
FIG. 10 shows a process performed by the wireless device for reconfiguration with delayed uplink transmission.

FIG. 10 shows a process 1000 performed by the UE for reconfiguration with delayed transmission of signaling and data on the uplink. Initially, the UE receives a first message (e.g., a Reconfiguration message) from the wireless network for reconfiguration of uplink and/or downlink physical channels (block 1012). The UE performs synchronization to establish the downlink physical channels (e.g., at the activation time indicated by the Reconfiguration message and in accordance with Synchronization procedure A) (block 1014). The UE then sends a second message (e.g., a Reconfiguration Complete message) to the wireless network indicating completion of the synchronization for the downlink physical channels (block 1016). Thereafter, the UE receives an indication that the uplink physical channels have been established by the wireless network (block 1018). This indication may be an L2 ACK, TPC commands, and so on. The UE delays transmission of signaling and data on the uplink physical channels, except for transmission of designated messages such as those for RRC signaling radio bearers, until the indication is received from the wireless network (block 1020).

Figure 11:
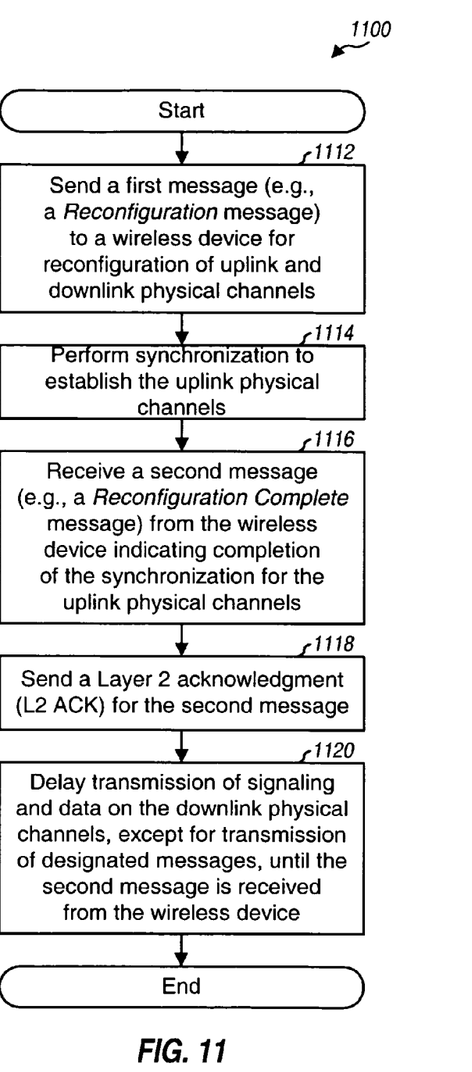
FIG. 11 shows a process performed by the wireless network for reconfiguration with delayed downlink transmission.

FIG. 11 shows a process 1100 performed by the UTRAN (Node Bs and RNC) for reconfiguration with delayed transmission of signaling and data on the downlink. Initially, the UTRAN sends a first message (e.g., a Reconfiguration message) to a wireless device for reconfiguration of uplink and/or downlink physical channels (block 1112). The UTRAN then performs synchronization (e.g., at the activation time indicated by the Reconfiguration message and in accordance with Synchronization procedure A) to establish the uplink physical channels (block 1114). The UTRAN receives a second message (e.g., a Reconfiguration Complete message) from the wireless device indicating that the downlink physical channels have been established (block 1116). Upon successfully decoding the message, the UTRAN sends a Layer 2 acknowledgment to the wireless device (block 1118). The UTRAN delays transmission of signaling and data on the downlink physical channels, except for transmission of designated messages, until reception of the second message (block 1120).

Figure 12:
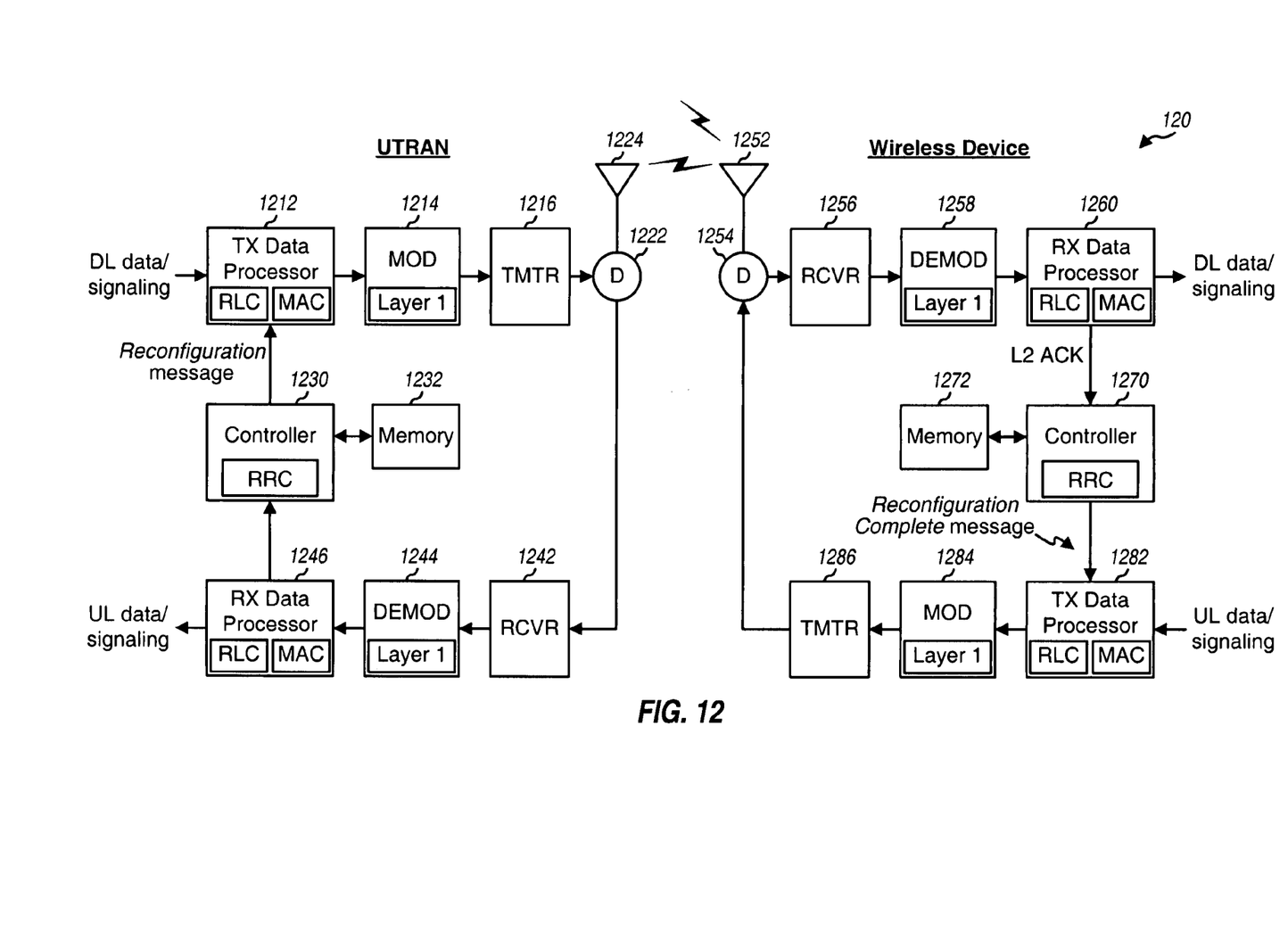
FIG. 12 shows a block diagram of network entities and the wireless device.

FIG. 12 shows a block diagram of an embodiment of UTRAN entities (e.g., Node B 110 and RNC 130) and wireless device (UE) 120. On the downlink, a transmit (TX) data processor 1212 at the UTRAN receives and processes (e.g., formats, encodes, and interleaves) signaling and data for UE 120. A modulator (MOD) 1214 receives and processed (e.g., channelizes/spreads, scrambles, and modulates) the output from TX data processor 1212 and provides a stream of chips. The processing for the signaling and data is described in 3GPP TS 25–321, TS 25–308, TS 25–212, and other 3GPP documents. A transmitter unit (TMTR) 1216 conditions (e.g., converts to analog signals, amplifies, filters, and frequency upconverts) the stream of chips to generate a downlink signal. The downlink signal is routed through a duplexer (D) 1222 and transmitted via an antenna 1224 to UE 120. The UTRAN can transmit signaling and data to multiple UEs simultaneously, but this is not shown in FIG. 12 for simplicity.

At UE 120, the downlink signal is received by an antenna 1252, routed through a duplexer 1254, and provided to a receiver unit (RCVR) 1256. Receiver unit 1256 conditions (e.g., filters, amplifies, and frequency downconverts) the received signal and further digitizes the conditioned signal to obtain samples. A demodulator (DEMOD) 1258 receives and processes (e.g., descrambles, channelizes/despreads, and demodulates) the samples to obtain symbols. Demodulator 1258 may implement a rake receiver that can process multiple instances (or multipath components) of the received signal to improve performance, as is known in the art. A receive (RX) data processor 1260 then processes (e.g., deinterleaves and decodes) the symbols, checks the received packets, and provides the decoded data. The processing by demodulator 1258 and RX data processor 1260 is complementary to the processing by modulator 1214 and TX data processor 1212, respectively. Moreover, the UTRAN and UE perform processing for the downlink transmission in accordance with the downlink logical, transport, and physical channels configured for the UE.

On the uplink, signaling and data are processed by a TX data processor 1282, further processed by a modulator 1284, conditioned by a transmitter unit 1286, routed through duplexer 1254, and transmitted via antenna 1252. The uplink signal is received by antenna 1224, routed through duplexer 1222, conditioned by a receiver unit 1242, processed by a demodulator 1244, and further processed by an RX data processor 1246 to recover the uplink signaling and data. The UTRAN and UE perform processing for the uplink transmission in accordance with the uplink logical, transport, and physical channels configured for the UE.

Controllers 1230 and 1270 control the operation at the UTRAN and UE, respectively. Memories 1232 and 1272 store data and code used by controllers 1230 and 1270, respectively.

For simplicity, FIG. 12 shows the RRC layer being implemented by controllers 1230 and 1270, the RLC and MAC layers being implemented by TX data processors 1212 and 1282 and RX data processors 1246 and 1260, and the physical layer being implemented by modulators 1214 and 1284 and demodulators 1244 and 1258. In general, these layers may be implemented by any of the processing units shown in FIG. 12.

For reconfiguration, the UTRAN transmits a Reconfiguration message to the UE. Controllers 1230 and 1270 perform the appropriate uplink and downlink synchronization procedures, respectively (e.g., as shown in FIGS. 6 through 9). Upon completing the downlink synchronization procedure, the UE transmits a Reconfiguration Complete message to the UTRAN. Upon successfully decoding the Reconfiguration Complete message, the UTRAN sends an L2 ACK to the UE. The RLC layer at the UE receives and forwards this L2 ACK to the RRC layer, which then enables transmission of signaling and data on the uplink.

For clarity, the delayed signaling/data transmission techniques have been specifically described for the UTRAN. These techniques may also be used for other CDMA networks (which may implement CDMA standards other than W-CDMA) and possibly other types of wireless communication networks (e.g., TDMA and FDMA networks). In general, if a reconfiguration necessitates synchronization of the physical layer in order to achieve reliable transmission of signaling and data, then each entity (e.g., the UE) in the network can delay the transmission of signaling/data until that entity can ascertain that the other entity (e.g., the UTRAN) has achieved synchronization of the appropriate link (e.g., the uplink). An entity can ascertain that the other entity has achieved synchronization based on signaling (e.g., L2 ACK, TPC commands, and so on) sent by the other entity.

The delayed signaling/data transmission techniques described herein may be implemented by various means. For example, these techniques may be implemented in hardware, software, or a combination thereof. For a hardware implementation, the processing units used to perform the delayed signaling/data transmission at the wireless device (e.g., RX data processor 1260, TX data processor 1282, and controller 1270) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Similarly, the processing units used to perform the delayed signaling/data transmission at the UTRAN (e.g., TX data processor 1212, RX data processor 1246, and controller 1230) may be implemented within one or more ASICs, DSPs, and so on.

For a software implementation, the delayed signaling/data transmission techniques may be implemented with modules (e.g., procedures, functions, and so on) that perform the functions described herein. The software codes may be stored in a memory unit (e.g., memories 1232 and 1272 in FIG. 12) and executed by a processor (e.g., controllers 1230 and 1270). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A wireless device in a wireless communication network, comprising:
a receive data processor operative to receive a first message from the wireless network for reconfiguration of uplink and downlink physical channels for a physical layer;
a controller operative to perform synchronization to establish the downlink physical channels; and
a transmit data processor operative to send a second message to the wireless network indicating completion of the synchronization for the downlink physical channels, and
wherein the receive data processor is further operative to receive an indication that the uplink physical channels have been established by the wireless network, and wherein the controller is further operative to delay transmission of signaling and data on the uplink physical channels, except for transmission of designated messages, until the indication is received from the wireless network.

2. The wireless device of claim 1, wherein the indication is an acknowledgment (ACK) sent by the wireless network in response to successful decoding of the second message by the wireless network.

3. The wireless device of claim 1, wherein the indication is derived from transmit power control (TPC) commands received from the wireless network.

4. The wireless device of claim 1, wherein the controller is operative to perform the synchronization starting at an activation time indicated by the first message.

5. The wireless device of claim 1, wherein the controller is operative to, for the synchronization, direct establishment of chip and frame timing for the downlink physical channels and initiate transmission of a power control preamble for a predetermined number of radio frames.

6. The wireless device of claim 1, wherein the synchronization is performed in accordance with a Synchronization procedure A defined by 3rd Generation Partnership Project (3GPP).

7. The wireless device of claim 1, wherein the first message is a Radio Bearer Reconfiguration message and the second message is a Radio Bearer Reconfiguration Complete message defined by 3GPP.

8. The wireless device of claim 1, wherein the first message is a Transport Channel Reconfiguration message and the second message is a Transport Channel Reconfiguration Complete message defined by 3GPP.

9. The wireless device of claim 1, wherein the first message is a Physical Channel Reconfiguration message and the second message is a Physical Channel Reconfiguration Complete message defined by 3GPP.

10. The wireless device of claim 1, wherein the designated messages are messages for a Radio Resource Control (RRC) layer.

11. The wireless device of claim 1, wherein the reconfiguration of the uplink and downlink physical channels is due to a change from a CELL_FACH state to a CELL_DCH state for the wireless device, the CELL_FACH and CELL_DCH states being defined by 3GPP.

12. The wireless device of claim 1, wherein the reconfiguration of the uplink and downlink physical channels is due to a change in configuration for the wireless device within a CELL_DCH state defined by 3GPP.

13. An integrated circuit comprising:
a receive data processor operative to receive a first message from a wireless communication network for reconfiguration of uplink and downlink physical channels for a physical layer;
a controller operative to perform synchronization to establish the downlink physical channels; and
a transmit data processor operative to send a second message to the wireless network indicating completion of the synchronization for the downlink physical channels, and
wherein the receive data processor is further operative to receive an indication that the uplink physical channels have been established by the wireless network, and wherein the controller is further operative to delay transmission of signaling and data on the uplink physical channels, except for transmission of designated messages, until the indication is received from the wireless network.

14. An apparatus in a wireless communication network, comprising:
means for receiving a first message from the wireless network for reconfiguration of uplink and downlink physical channels for a physical layer;
means for performing synchronization to establish the downlink physical channels;

means for sending a second message to the wireless network indicating completion of the synchronization for the downlink physical channels;

means for receiving an indication that the uplink physical channels have been established by the wireless network; and means for delaying transmission of signaling and data on the uplink physical channels, except for transmission of designated messages, until the indication is received from the wireless network.

15. The apparatus of claim 14, wherein the means for performing synchronization includes means for establishing chip and frame timing for the downlink physical channels, and means for transmitting a power control preamble for a predetermined number of radio frames.

16. A wireless device in a UMTS (Universal Mobile Telecommunications System) Terrestrial Radio Access Network (UTRAN), comprising:

a receive data processor operative to receive a Reconfiguration message from the UTRAN for reconfiguration of uplink and downlink physical channels;

a controller operative to perform Synchronization procedure A, defined by 3GPP, to establish the downlink physical channels; and a transmit data processor operative to send a Reconfiguration Complete message to the UTRAN indicating completion of the Synchronization procedure A for the downlink physical channels, and wherein the receive data processor is further operative to receive a Layer 2 acknowledgment (L2 ACK) sent by the UTRAN in response to successful decoding of the Reconfiguration Complete message, and wherein the controller is further operative to delay transmission of signaling and data on the uplink physical channels, except for transmission of messages for Radio Resource Control (RRC) signaling radio bearers, until the L2 ACK is received from the wireless network.

17. A base station in a wireless communication network, comprising:

a transmit data processor operative to send a first message to a wireless device for reconfiguration of uplink and downlink physical channels for a physical layer;

a controller operative to perform synchronization to establish the uplink physical channels; and a receive data processor operative to receive a second message from the wireless device indicating that the downlink physical channels have been established by the wireless device, and wherein the controller is operative to delay transmission of signaling and data on the downlink physical channels, except for transmission of designated messages, until the second message is received from the wireless device.

18. The base station of claim 17, wherein the controller is operative to, for the synchronization, direct establishment of chip and frame timing for the uplink physical channels.

19. The base station of claim 17, wherein the first message is a Radio Bearer Reconfiguration message and the second message is a Radio Bearer Reconfiguration Complete message defined by 3GPP.

20. The base station of claim 17, wherein the reconfiguration of the uplink and downlink physical channels is due to a change from a CELL_FACH state to a CELL_DCH state for the wireless device, the CELL_FACH and CELL_DCH states being defined by 3GPP.

21. The base station of claim 17, wherein the reconfiguration of the uplink and downlink physical channels is due to a change in configuration for the wireless device within a CELL_DCH state defined by 3GPP.

22. An apparatus in a wireless communication network, comprising:

means for sending a first message to a wireless device for reconfiguration of uplink and downlink physical channels for a physical layer;

means for performing synchronization to establish the uplink physical channels;

means for receiving a second message from the wireless device indicating that the downlink physical channels have been established by the wireless device; and means for delaying transmission of signaling and data on the downlink physical channels, except for transmission of designated messages, until the second message is received from the wireless device.

* * * * *